C. Embrey,
Bee Hive.

No. 108,244.          Patented Oct. 11, 1870.

Witnesses
H. H. Young
Chas. W. Rempff

Chas Embrey
Inventor
By David A. Burr
atty.

United States Patent Office.

CHARLES EMBREY, OF WILLIAMSPORT, MARYLAND.

Letters Patent No. 108,244, dated October 11, 1870.

IMPROVEMENT IN BEE-HIVES.

The Schedule referred to in these Letters Patent and making part of the same.

I, CHARLES EMBREY, of Williamsport, in the county of Washington and State of Maryland, have invented an Improvement in Bee-Hives, of which the following is a specification.

My invention relates to the use of thin strips placed centrally on each side of the comb-frame of a bee-hive, parallel to the ends thereof, about midway between them, for the purpose of receiving and holding in proper position pieces of comb that may be taken and placed therein from other hives or frames, and to serve also as supports and as guides for the bees in building straight combs.

In the accompanying drawing—

Figure 1:
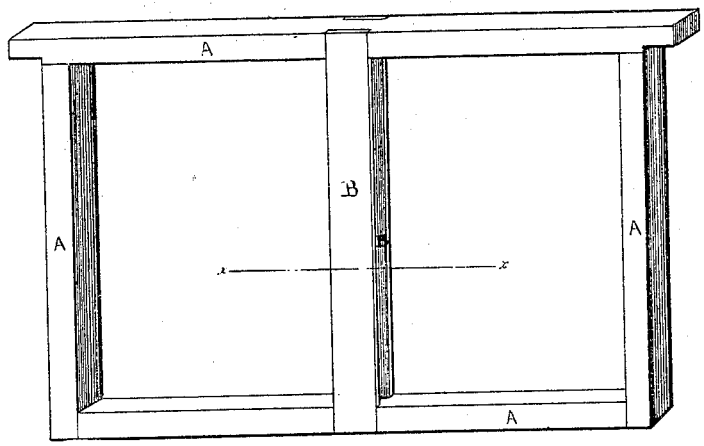

Figure 1 is a view, partially in perspective, of my improved comb-frame; and

Figure 2:

Figure 2, a top view of the central portion thereof.

A A is the comb-frame, constructed in the usual manner, and which may be rectangular in form, as illustrated, or made with unequal ends or sides, to fit into hives of peculiar construction.

B B are two narrow and very thin strips, running from top to bottom of the frame, one on each side, at right angles to the upper or lower bar thereof. These strips are let into the upper and lower bars, so as to be flush, or nearly so, with the outer surface thereof, as illustrated in fig. 2. They serve as clamps to hold pieces of comb that may be inserted between them, dispensing with the necessity of strings, wires, or pins for the purpose. They serve also, when the frame is empty, as guides in directing the bees to build a straight comb therein, and, when full, as a support thereto. They may be removed, if desired, without injury to the comb, so soon as the bees attach the comb to the frame, and are so secured to the frame as to admit also of ready detachment in removing the finished comb.

I claim as my invention—

Strips B B, extending between the upper and lower bars of a comb-frame, A, on each side thereof, to hold between them pieces of comb, and to guide the bees in filling the frame, substantially as herein set forth.

Witness my hand to this specification of my improved bee-hive.

CHARLES EMBREY.

Witnesses:
THEODORE EMBREY,
G. W. ROBINSON.